United States Patent
Fujita et al.

[11] Patent Number: 6,060,804
[45] Date of Patent: May 9, 2000

[54] VIBRATION GENERATING MECHANISM

[75] Inventors: Etsunori Fujita, Hatsukaichi; Yutaka Sakamoto, Hiroshima; Hitoshi Mikami, Osaka; Yasuhiro Marukawa, Funabashi, all of Japan

[73] Assignees: Delta Tooling Co., Ltd., Hiroshima; Sumitomo Special Metals Co., Ltd., Osaka, both of Japan

[21] Appl. No.: 09/097,735

[22] Filed: Jun. 16, 1998

[51] Int. Cl.[7] .................................................. H02K 33/06
[52] U.S. Cl. ................................ 310/81; 310/12; 310/36; 310/15
[58] Field of Search ............................... 310/15, 36, 103, 310/20, 12, 80, 81; 340/825.32, 825.44; 367/189; 601/46, 51, 53; 73/662, 667

[56] References Cited

U.S. PATENT DOCUMENTS

| | | |
|---|---|---|
| 3,088,062 | 4/1963 | Hudimac . |
| 3,609,425 | 9/1971 | Sheridan . |
| 3,638,963 | 2/1972 | Van Leeuwen . |
| 3,770,290 | 11/1973 | Bottalico ........................... 280/106.5 R |
| 3,842,753 | 10/1974 | Theodore et al. .................... 105/157 R |
| 3,941,402 | 3/1976 | Yankowski et al. ................. 280/124 R |
| 3,952,979 | 4/1976 | Hansen . |
| 4,189,699 | 2/1980 | Burke, Jr. ................................. 335/229 |
| 4,300,067 | 11/1981 | Schumann . |
| 4,432,441 | 2/1984 | Kurokawa ............................... 248/559 |
| 4,498,038 | 2/1985 | Malueg . |
| 4,502,652 | 3/1985 | Breitbach . |
| 4,583,752 | 4/1986 | Breitbach . |
| 4,595,166 | 6/1986 | Kurokawa . |
| 4,605,194 | 8/1986 | Binnig et al. ............................ 248/559 |
| 4,664,352 | 5/1987 | Shibuki et al. .......................... 248/562 |
| 4,710,656 | 12/1987 | Studer . |
| 4,802,660 | 2/1989 | Engdahl . |
| 4,913,482 | 4/1990 | Hanai et al. ............................ 296/65.1 |
| 4,950,931 | 8/1990 | Goldenberge et al. ..................... 310/36 |
| 4,969,624 | 11/1990 | Ustelentsev et al. .................... 248/550 |
| 5,017,819 | 5/1991 | Patt et al. . |
| 5,120,030 | 6/1992 | Lin et al. . |
| 5,231,336 | 7/1993 | Van Namen ............................. 318/128 |
| 5,415,140 | 5/1995 | Rigazzi ................................. 123/197.1 |
| 5,419,528 | 5/1995 | Carter et al. ............................ 248/585 |
| 5,467,720 | 11/1995 | Korenaga et al. . |
| 5,487,533 | 1/1996 | Kurita et al. . |
| 5,584,367 | 12/1996 | Berdut . |
| 5,587,615 | 12/1996 | Murray et al. ............................ 310/30 |
| 5,633,547 | 5/1997 | Coombs . |

FOREIGN PATENT DOCUMENTS

| | | |
|---|---|---|
| 0 393 492 | 10/1990 | European Pat. Off. . |
| 31 17 377 | 12/1982 | Germany . |
| 36 01 182 | 7/1987 | Germany . |
| 58-89077 | 5/1983 | Japan . |
| 61-231871 | 10/1986 | Japan . |
| 63-149446 | 6/1988 | Japan . |
| 1-16252 | 1/1989 | Japan . |
| 434246 | 2/1992 | Japan . |
| 7217687 | 8/1995 | Japan . |
| 2 006 958 | 5/1979 | United Kingdom . |
| 2222915 | 3/1990 | United Kingdom . |
| 2 296 068 | 6/1996 | United Kingdom . |

*Primary Examiner*—Thomas M. Dougherty
*Assistant Examiner*—Tran N Nguyen
*Attorney, Agent, or Firm*—Wenderoth, Lind & Ponack, L.L.P.

[57] ABSTRACT

A vibration generating mechanism includes first and second permanent magnets spaced from each other with the same magnetic poles opposed to each other, and an electromotive actuator for driving the first permanent magnet. The electromotive actuator moves the first permanent magnet periodically and reciprocatingly relative to the second permanent magnet to change the opposing area of the first and second permanent magnets thereby causing the second permanent magnet to vibrate relative to the first permanent magnet.

7 Claims, 19 Drawing Sheets

ATTRACTION

REPULSION

REPULSION

Fig.5
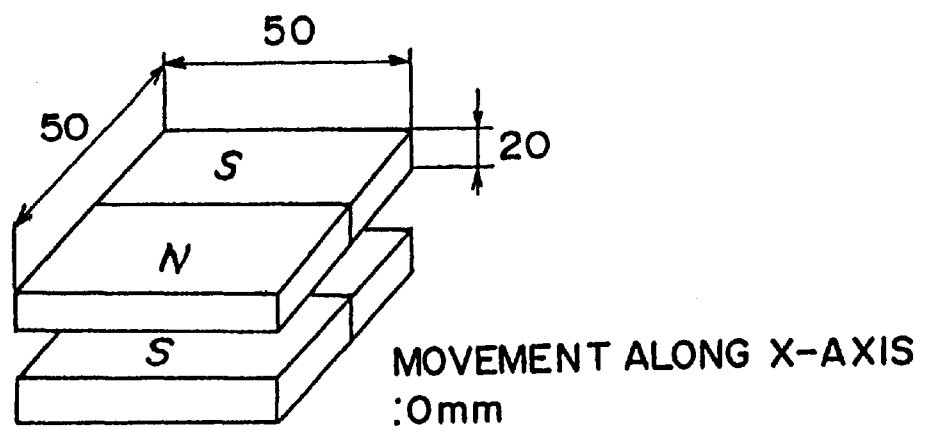
MOVEMENT ALONG X-AXIS
:0mm
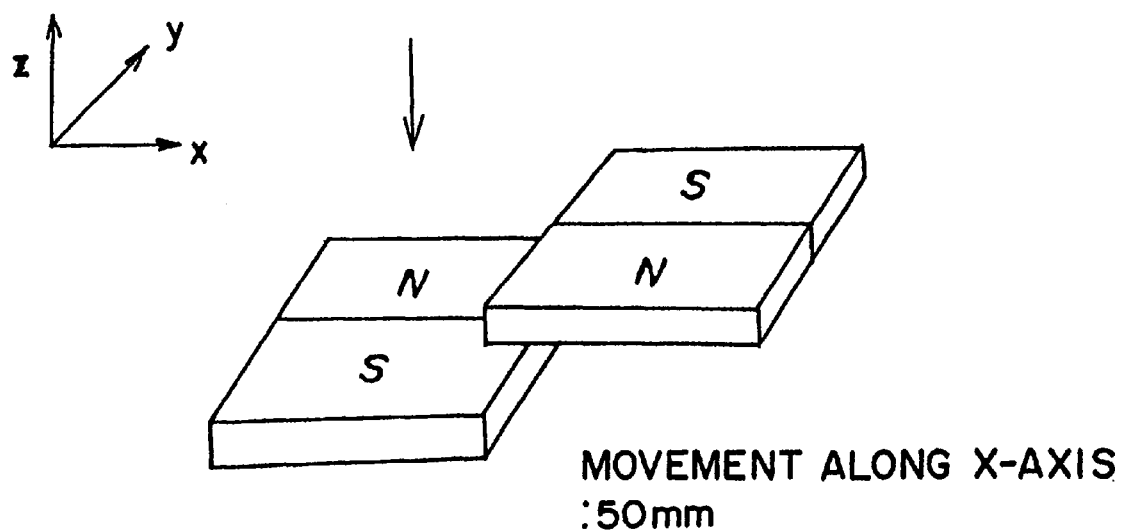
MOVEMENT ALONG X-AXIS
:50mm

ROTATIONAL ANGLE :0°

ROTATIONAL ANGLE :90°

Fig. 9 RELATIONSHIP BETWEEN LOAD AND AREA WHEN ROTATIONAL ANGLE IS CHANGED 6,060,804

VIBRATION GENERATING MECHANISM

BACKGROUND OF THE INVENTION

1. Field of the Invention

The present invention relates generally to a mechanism for generating vibration and, in particular but not exclusively, to a vibration generating mechanism for generating vibration energy in the vertical direction by making use of repulsive forces of a plurality of permanent magnets.

2. Description of Related Art

An exciter or vibration generator has been used to artificially generate vibration to investigate vibration characteristics of a structure. Exciters of an electromotive type and those employing an unbalanced mass or a cam are known.

An exciter employing a link mechanism such as, for example, a crank is, however, required to have a relatively large drive motor because a load is directly applied to the drive motor, while an exciter of the electromotive type cannot cope with low frequencies.

Also, because conventional exciters are generally large-sized, not only a relatively large space but a time-consuming installation operation are required. Further, the conventional exciters generate a large amount of heat and, hence, require forced air cooling by a fan or the like, which in turn causes a problem in that noise evaluation cannot be achieved.

In addition, because the conventional exciters are generally of a complicated structure and are, hence, heavy and costly, light and inexpensive ones have been desired.

SUMMARY OF THE INVENTION

The present invention has been developed to overcome the above-described disadvantages.

It is accordingly an objective of the present invention to provide a vibration generating mechanism having a plurality of permanent magnets incorporated therein and capable of realizing a compact and inexpensive exciter with minimized noise emission.

Another objective of the present invention is to provide the vibration generating mechanism of the above-described type which has a simple construction and can be readily manufactured at a low cost.

In accomplishing the above and other objectives, the vibration generating mechanism according to the present invention includes first and second permanent magnets spaced from each other with the same magnetic poles opposed to each other, and an electromotive actuator for driving the first permanent magnet. The electromotive actuator moves the first permanent magnet periodically and reciprocatingly relative to the second permanent magnet to change the opposing area of the first and second permanent magnets, thereby causing the second permanent magnet to vibrate relative to the first permanent magnet.

When the first and second permanent magnets are spaced vertically, it is preferred that a first pair of permanent magnets and a second pair of permanent magnets be disposed on respective sides of the first and second permanent magnets. In this case, each of the first and second pairs of permanent magnets are spaced vertically with the same magnetic poles opposed to each other. By so doing, a load applied vertically to the second permanent magnet is supported by means of repulsive forces of the first and second pairs of permanent magnets.

Alternatively, at least two elastic members may be disposed on respective sides of the first and second permanent magnets, wherein a load applied vertically to the second permanent magnet is supported by means of restoring forces of the at least two elastic members.

Advantageously, the electromotive actuator includes a holder slidably mounted on a mounting surface, a coil wound around at least one end of the holder, and at least one permanent magnet spaced a predetermined distance from the coil, wherein the first permanent magnet is secured to the holder. In this case, the holder is reciprocated by causing pulse current to flow though the coil.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein:

FIG. 5 is a schematic diagram depicting mutually spaced permanent magnets with the same magnetic poles opposed to each other and also depicting the case where one of the permanent magnets is moved relative to the other (to change the opposing area thereof);

DETAILED DESCRIPTION OF THE PREFERRED EMBODIMENTS

Figure 1:
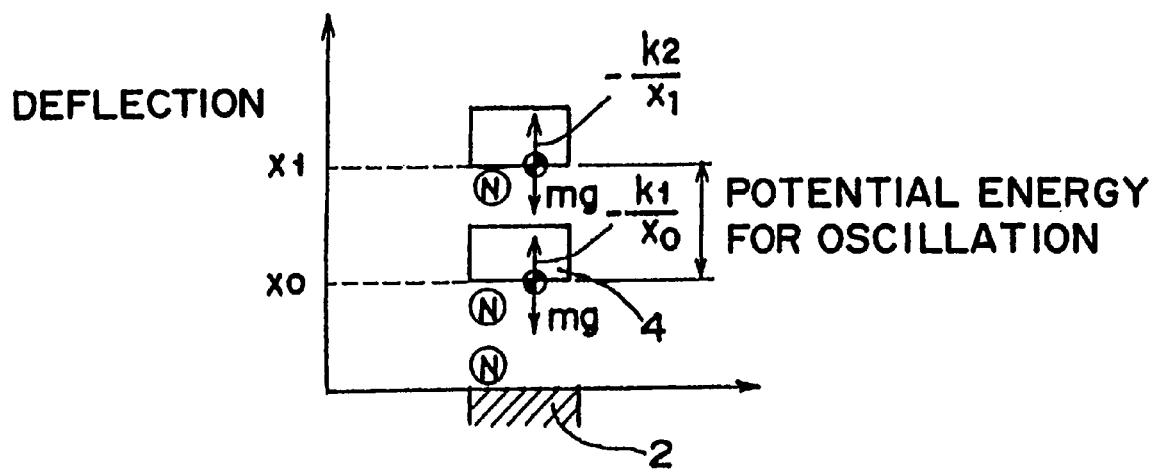
FIG. 1 is a schematic diagram of a magnetic spring applied to a vibration generating mechanism according to the present invention, particularly depicting balanced positions of two permanent magnets on the input side and on the output side.

This application is based on application No. 8-350828 filed Dec. 27, 1996 in Japan, the content of which is incorporated hereinto by reference.

Referring now to the drawings, preferred embodiments of the present invention are discussed hereinafter.

When a magnetic spring structure is made up of at least two spaced permanent magnets with the same magnetic poles opposed to each other, the two spaced permanent magnets are held in positions not in contact with each other. Accordingly, if the friction loss in the structure itself is ignored, the static characteristics thereof are reversible, i.e., the output (return) is on the same line as the input (go) and is nonlinear. Furthermore, negative damping can be easily produced by changing the static magnetic field (the arrangement of the magnets) with a small amount of input utilizing the degree of freedom peculiar to the non-contact pair and the instability of the float control system.

The present invention has been developed taking note of this fact. At the time of input (go) and at the time of output (return), the geometric dimensions between the two permanent magnets are changed by a mechanism inside a kinetic system in which the permanent magnets are placed or by an external force. The change in geometric dimensions is converted into a repulsive force in the kinetic system to make the repulsive force from the balanced position of the two permanent magnets greater at the time of output than at the time of input.

The fundamental principle is explained hereinafter.

Figure 2:
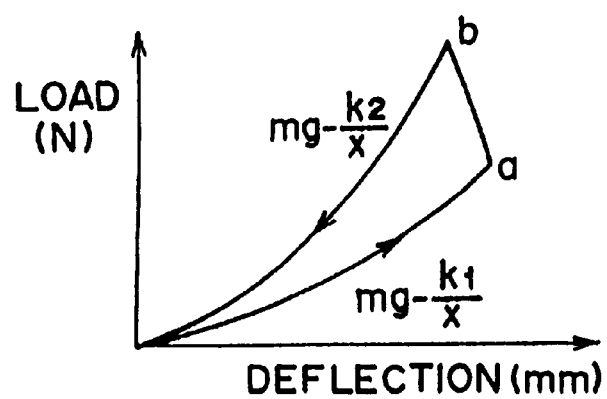
FIG. 2 is a graph of the fundamental characteristics of the magnetic spring of FIG. 1, particularly showing a relationship between the load applied to one of the two permanent magnets and the deflection thereof from the balanced position.

FIG. 1 schematically depicts balanced positions of two permanent magnets 2 and 4 on the input side and on the output side, while FIG. 2 depicts the fundamental characteristics of the magnetic spring structure indicating a relationship between the load applied to one of the two permanent magnets and the deflection thereof from the balanced position.

As shown in FIG. 1, when the balanced position of the permanent magnet 4 on the input side relative to the permanent magnet 2 and the spring constant of the magnetic spring are $x_0$ and $k_1$, respectively, and the balanced position thereof on the output side and the spring constant are $x_1$ and $k_2$, respectively, an area conversion is performed between $x_0$ and $x_1$, and the following relations hold at respective balanced positions.

$-k_1/x_0 + mg = 0$ $-k_2/x_1 + mg = 0$ $k_2 > k_1$

Accordingly, the static characteristics indicate negative damping characteristics, as shown in FIG. 2, and it is conceivable that the potential difference between the position $x_1$ and the position $x_0$ corresponds to the potential energy for oscillation.

A model of FIG. 1 was made and a relationship between the load and the deflection was measured by changing the time during which the load was applied. As a result, a graph shown in FIG. 3 was obtained, which can be interpreted as meaning that when the two permanent magnets 2 and 4 approach their closest position, a great repulsive force is produced, and that when the amount of deflection from the balanced position changes slightly, a friction loss is produced by a damper effect of the magnetic spring, thus creating a damping term.

Figure 3:
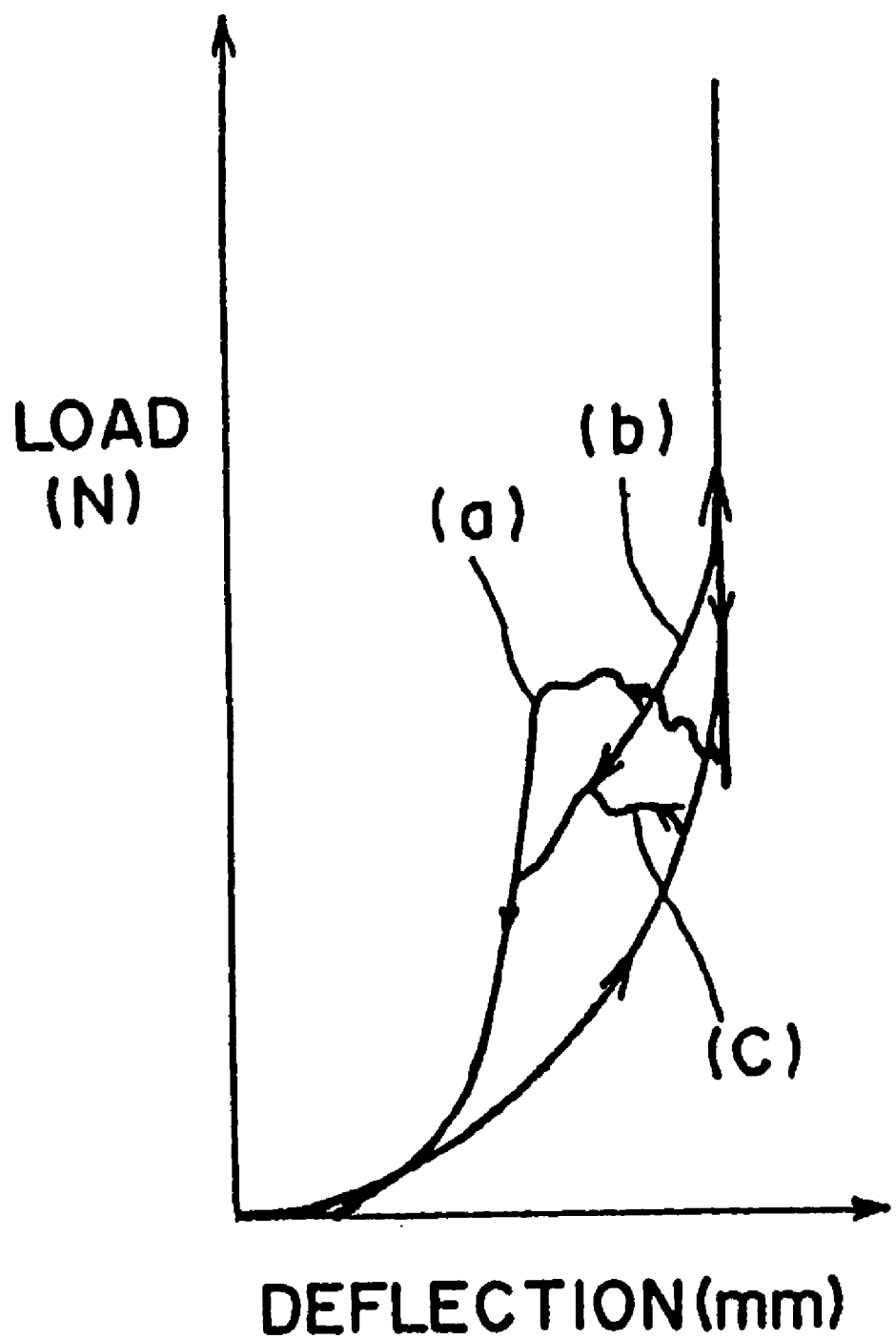
FIG. 3 is a graph showing a relationship between the load measured and the deflection.

In FIG. 3, (a) is a curve obtained when a constant load was applied, and the time during which the load was being applied becomes shorter in the order of (a), (b) and (c). In other words, the static characteristics vary according to the manner in which the load is applied, and the longer is the time during which the load is applied, the greater the impulse is.

As for rare-earth magnets, the strength of magnetization does not depend upon the magnetic field. More specifically, because the internal magnetic moment is not easily influenced by the magnetic field, the strength of magnetization on a demagnetization curve hardly changes, and the value is kept almost the same as that of saturation magnetization. Accordingly, in the case of rare-earth magnets, the force can be calculated using a charge model assuming that the magnetic load is uniformly distributed on its surfaces.

Figure 4A:
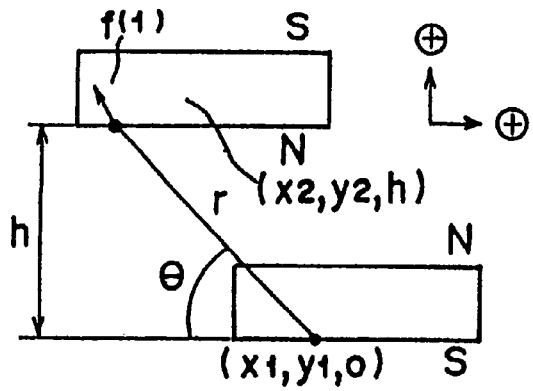
FIG. 4A is a schematic diagram depicting the way of thinking of input and output in a charge model assuming that magnetic charges are uniformly distributed on end surfaces of the permanent magnets, and particularly showing attraction.
Figure 4B:
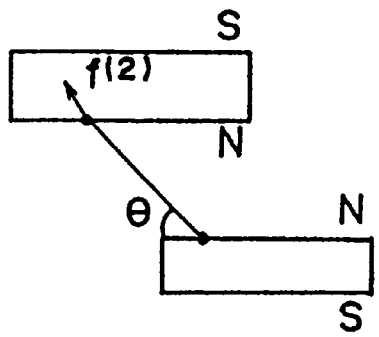
FIG. 4B is a diagram similar to FIG. 4A, but particularly showing repulsion.
Figure 4C:
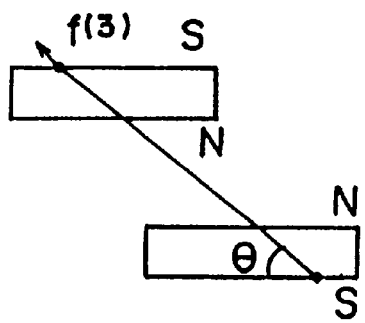
FIG. 4C is a diagram similar to FIG. 4A, but particularly showing repulsion at locations different from those shown in FIG. 4B.

FIGS. 4A–4C depicts the way of thinking in which a magnet is defined as a set of smallest unit magnets. The relationship of forces acting among the unit magnets was calculated by classifying it into three.

(a) Attraction (because the unit magnets are identical in both r and m, two types are defined by one)

$f^{(1)} = (m^2/r^2) dx_1 dy_1 dx_2 dy_2$ $f_x^{(1)} = f^{(1)} \cos \theta$ $f_z^{(1)} = f^{(1)} \sin \theta$ (b) Repulsion $f_x^{(2)} = f^{(2)} \cos \theta$ $$f_z^{(2)} = f^{(2)} \sin \theta$$

(c) Repulsion $$f_x^{(3)} = f^{(3)} \cos \theta$$

$$f_z^{(3)} = f^{(3)} \sin \theta$$

Accordingly, $$-f_x = 2f_x^{(1)} - f_x^{(2)} - f_x^{(3)}$$

$$-f_z = 2f_z^{(1)} - f_z^{(2)} - f_z^{(3)}$$

Hereupon, the Coulomb's law is expressed by:

$$F = k(q_1 q_2 / r^2) \quad r: \text{distance}$$

$$q = MS \quad q1, q2: \text{magnetic charge}$$

$$M(m): \text{strength of magnetization}$$

$$S: \text{area}$$

The forces can be obtained by integrating the above ($-f_x$) and ($-f_z$) with respect to the range of the magnet size.

Figure 6:
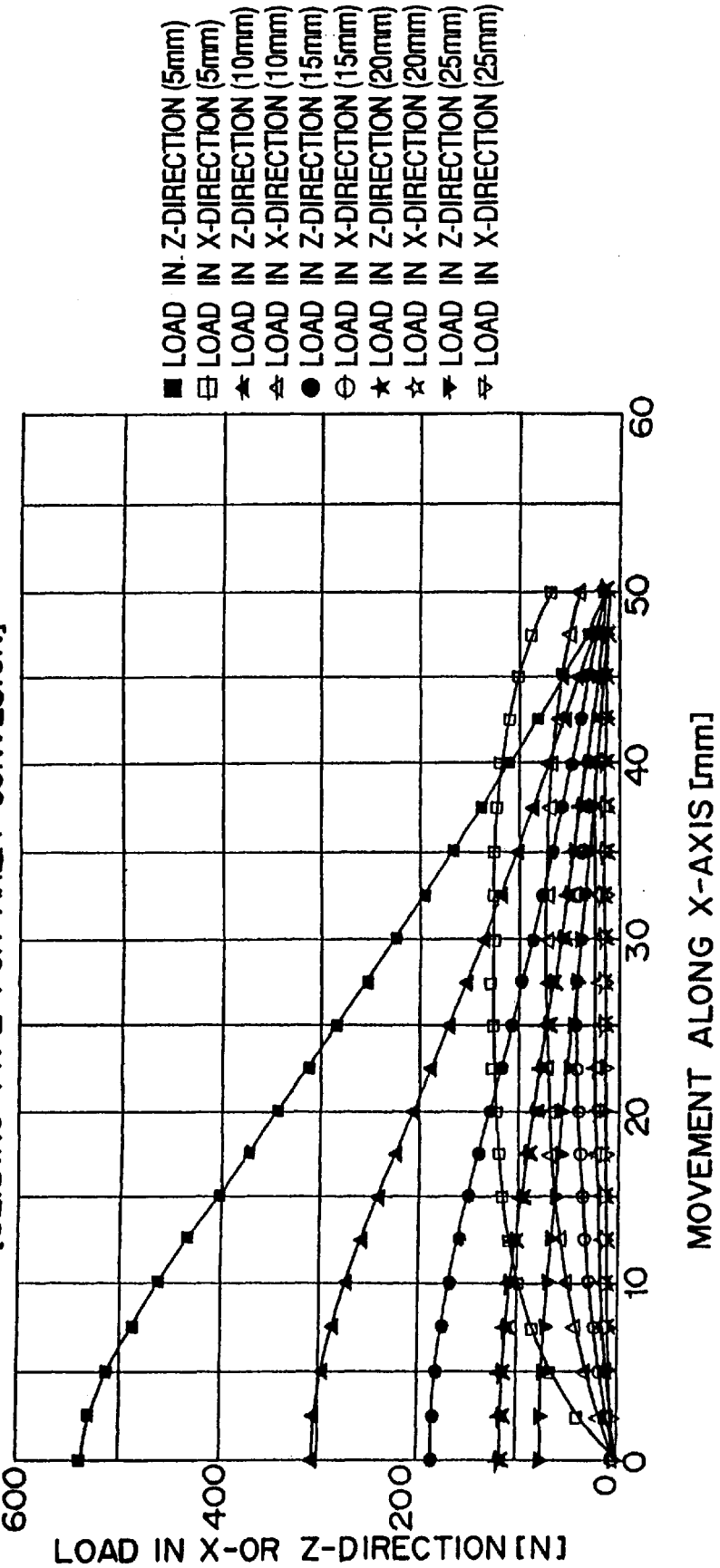
FIG. 6 is a graph showing the load in X-axis and Z-axis directions relative to the amount of movement in the X-axis direction when calculation was carried out based on FIG. 5.

As shown in FIG. 5, calculation was carried out for each magnetic gap by moving one of two opposing magnets relative to the other from the condition in which they are completely lapped (the length of movement x=0 mm) to the condition in which one of them is completely slipped (the length of such movement x=50 mm). The results of calculation are shown in FIG. 6. Although the internal magnetic moment is defined as being constant, it is somewhat corrected because disorder is caused around the magnets when the magnetic gap is small.

The above calculation results are generally in agreement with the results of actual measurement. The force required for moving the point (a) to the point (b) in FIG. 2 is the x-axis load, while the output is represented by the z-axis load. The relationship of input<output caused by instability is statically clarified.

Figure 7:
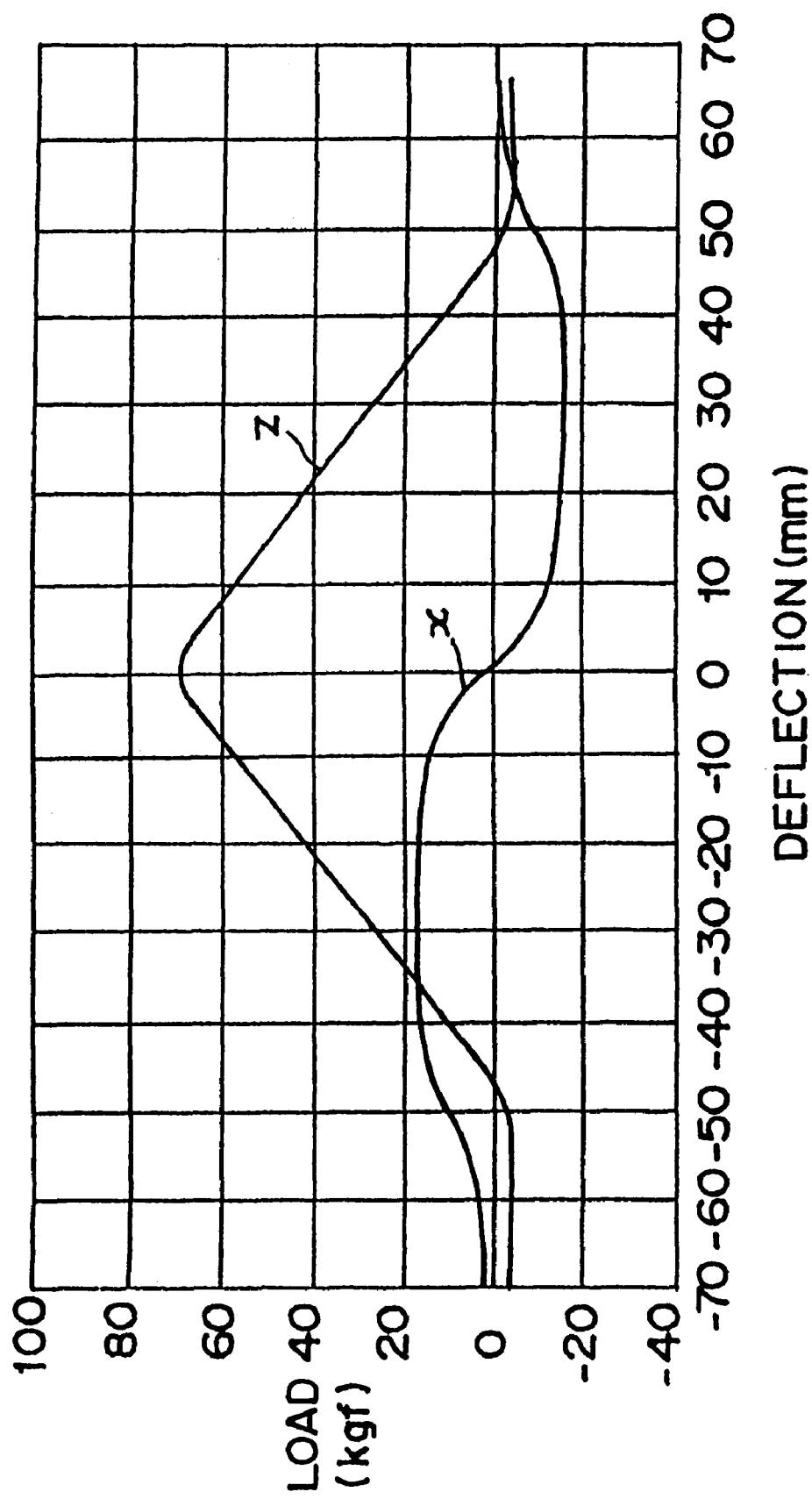
FIG. 7 is a graph showing a relationship between the load and deflection when the distance between the permanent magnets of FIG. 5 is kept constant, and one of the magnets is moved relative to the other from the completely slipped condition to the completely lapped one, and again to the completely slipped one.

FIG. 7 is a graph indicating a relationship between the x-axis load and the z-axis load when the distance between the magnets is kept 3 mm, and the condition of the magnets is changed from the completely slipped condition to the completely lapped one, and again to the completely slipped one. This graph is a characteristic curve indicating that the absolute value of the x-axis load is the same but the direction of output is reversed. When one of the magnets is moved relative to the other to approach the completely lapped condition, the former receives a resistance, resulting in damping. On the other hand, when one of the magnets is moved relative to the other from the completely lapped condition to the completely slipped condition, the former is accelerated.

Figure 8:
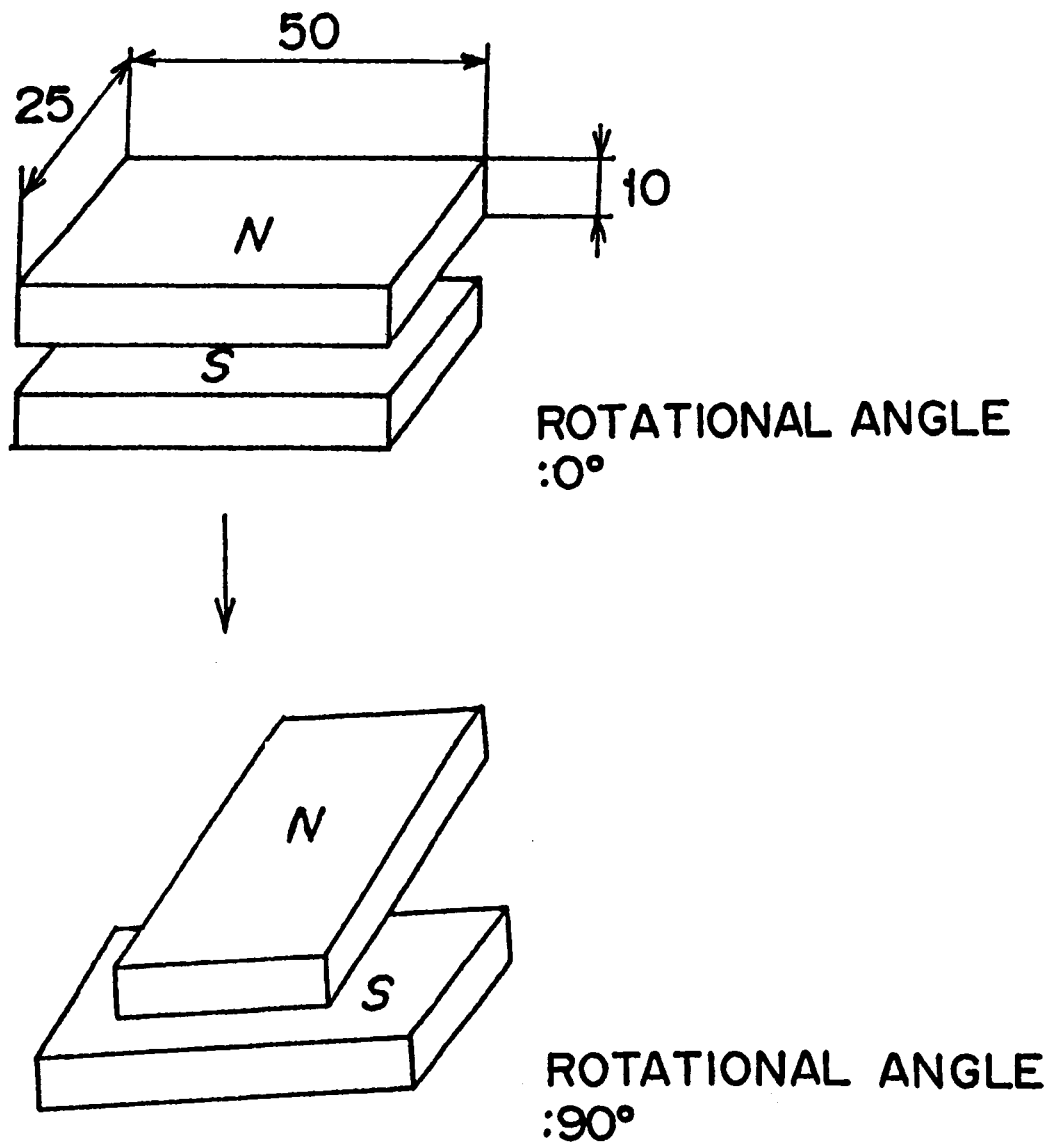
FIG. 8 is a schematic diagram depicting mutually spaced permanent magnets with the same magnetic poles opposed to each other and also depicting the case where one of the magnets is rotated relative to the other (to change the opposing area thereof)
Figure 9:
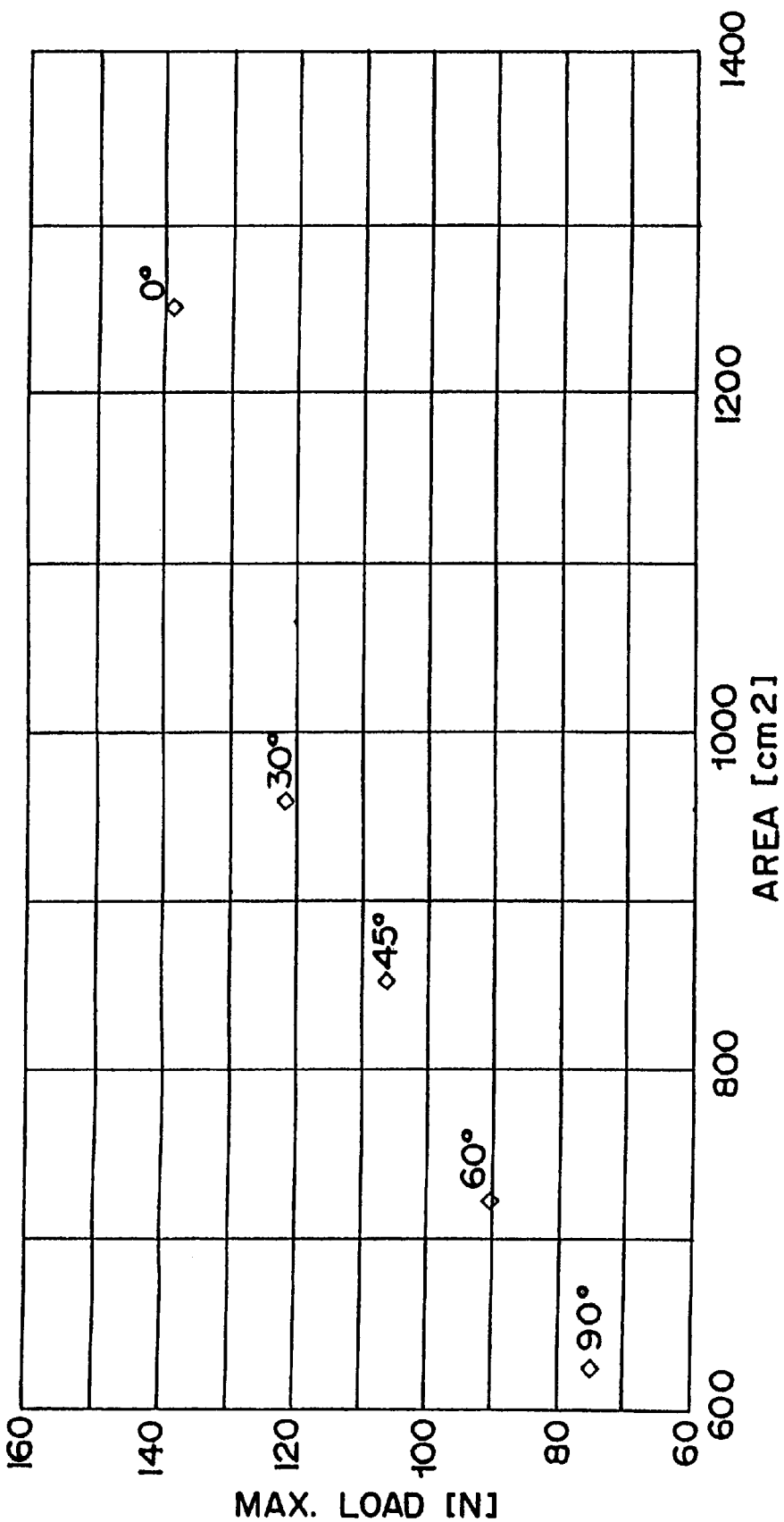
FIG. 9 is a graph showing the maximum load relative to the opposing area when one of the magnets is rotated, as shown in FIG. 8.

When the rotational angle of the opposing magnets is changed as shown in FIG. 8, a graph shown in FIG. 9 was obtained. As a matter of course, the maximum load decreases as the opposing area decreases. This graph indicates that the output can be changed through an area conversion which can be performed by applying a predetermined input.

Figure 10:
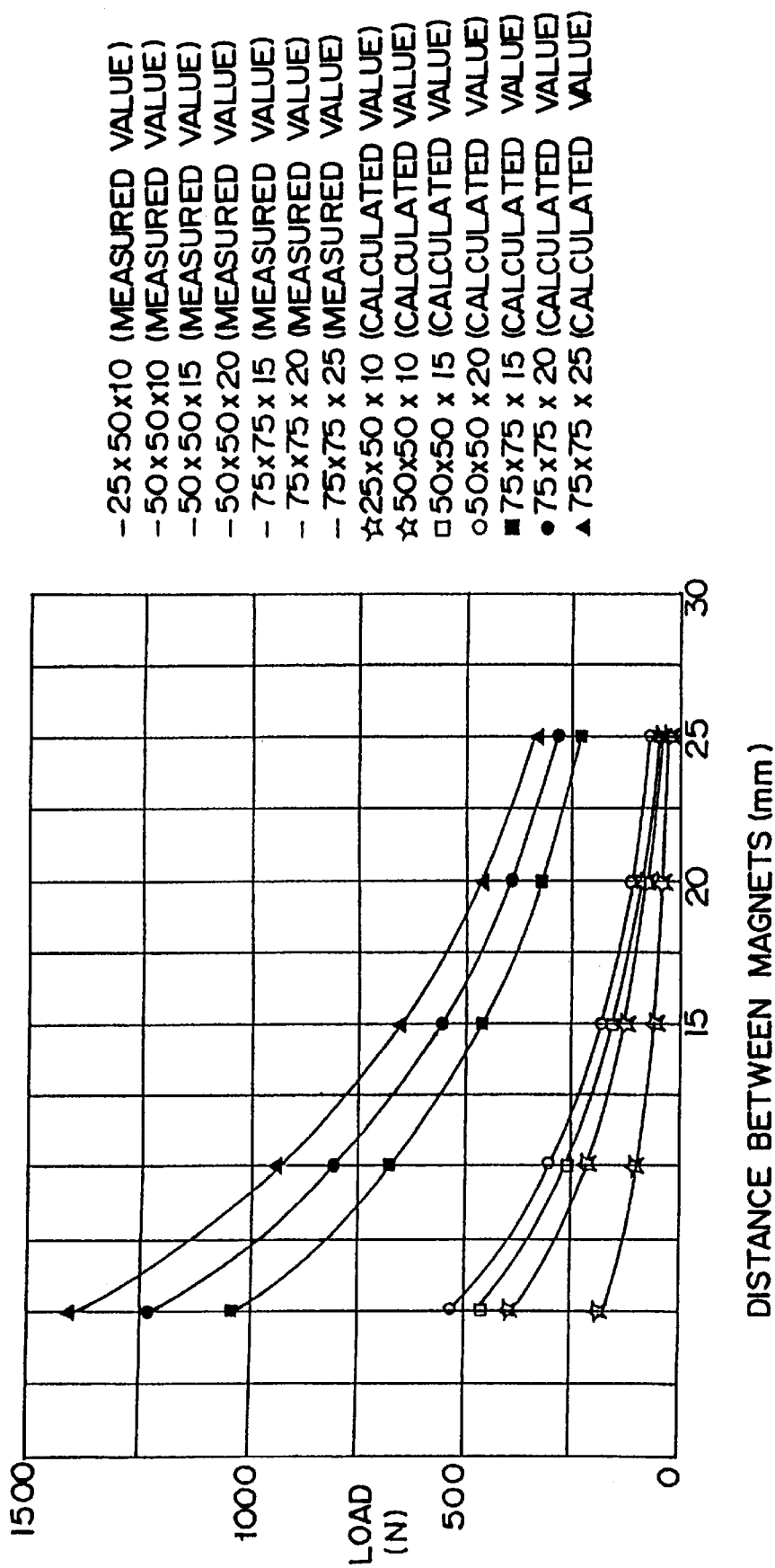
FIG. 10 is a graph showing a relationship between the load and the distance between the magnets when neodymium-based magnets are employed.

FIG. 10 is a graph indicating a relationship between the load and the distance between the magnets when neodymium-based magnets are employed. The repulsive force increases with an increase in mass. The repulsive force F is given by:

F∝Br²×(geometric dimensions)

Br: strength of magnetization

The geometric dimensions mean the size determined by the distance between the opposing magnets, the opposing area, the magnetic flux density, the strength of the magnetic field or the like. If the magnet material is the same, the strength of magnetization (Br) is constant and, hence, the repulsive force of the magnets can be changed by changing the geometric dimensions.

Figure 11:
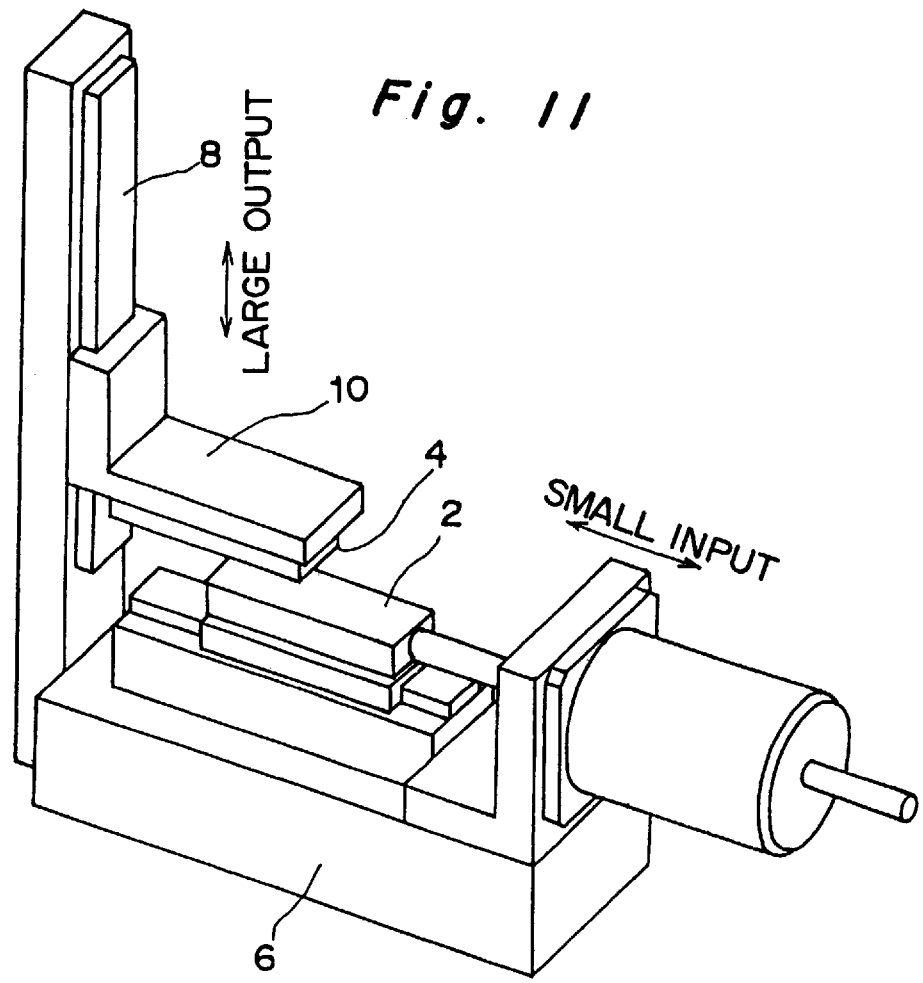
FIG. 11 is a perspective view of a sliding-type principle model in which geometric dimensions between the two permanent magnets are changed by changing the opposing area thereof.

FIG. 11 depicts a sliding-type principle model wherein the geometric dimensions are changed by sliding one of two permanent magnets 2, 4 relative to the other to change the opposing area thereof.

As shown in FIG. 11, the permanent magnet 2 is slidably mounted on a base 6 to which a linear slider 8 is secured so as to extend vertically. An L-shaped member 10 is vertically sidably mounted on the linear slider 8. The permanent magnet 4 is secured to the lower surface of the L-shaped member 10 so as to confront the permanent magnet 2 with the same magnetic poles opposed to each other.

In the sliding-type principle model of the above-described construction, when permanent magnets of a size of 50 mmL×25 mmW×10 mmH (Trade name: NEOMAX-39SH) were used for the permanent magnets 2, 4 and a load having a total weight of about 3.135 kg was used, and when the permanent magnet 2 was caused to slide relative to the permanent magnet 4, a graph as shown in FIG. 12 was obtained.

Figure 12:
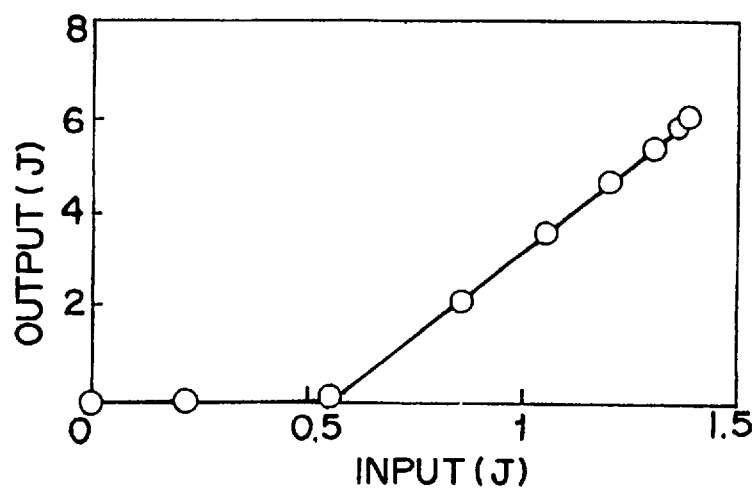
FIG. 12 is a graph showing a relationship between input and output obtained from the sliding-type principle model of FIG. 11.

The graph of FIG. 12 depicts a relationship between experimental values of input work and those of output work. As can be seen therefrom, an output work of about 4 J is obtained from an input work of about 0.5 J. This means that a relatively large output work can be derived from a relatively small input by making use of negative damping characteristics which the magnetic spring made up of the two opposing permanent magnets 2, 4 has, or by changing static magnetic energy.

Figure 13:
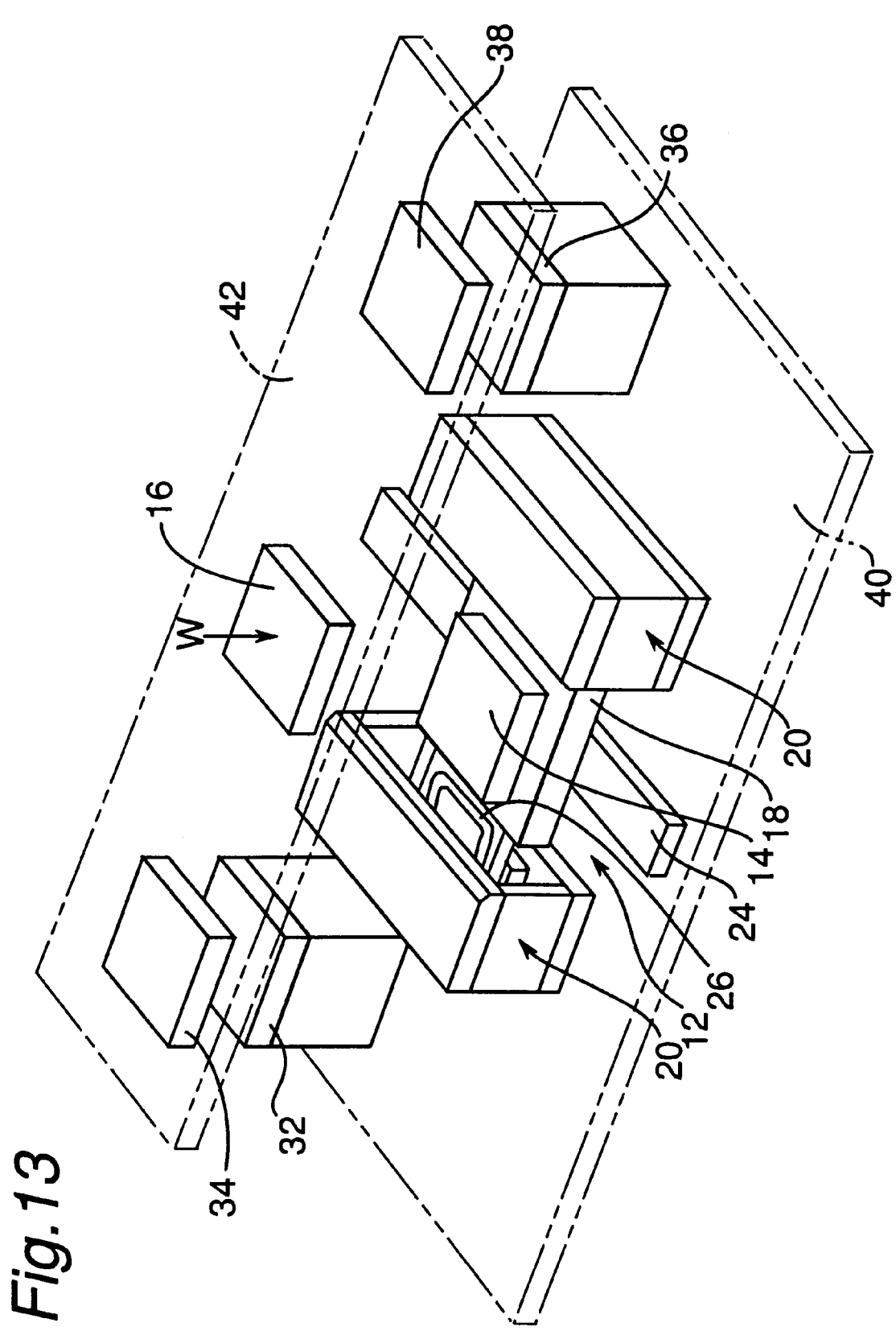
FIG. 13 is a schematic perspective view of a vibration generating mechanism to which the sliding-type principle model of FIG. 11 is applied.

FIG. 13 depicts a vibration generating mechanism to which the sliding-type principle model referred to above is applied.

The vibration generating mechanism of FIG. 13 includes an electromotive-type actuator 12, a first permanent magnet 14 secured to the electromotive-type actuator 12, and a vertically movable second permanent magnet 16 disposed above and spaced a predetermined distance from the first permanent magnet 14, with the same (repulsive) magnetic poles opposed to each other.

Figure 14:
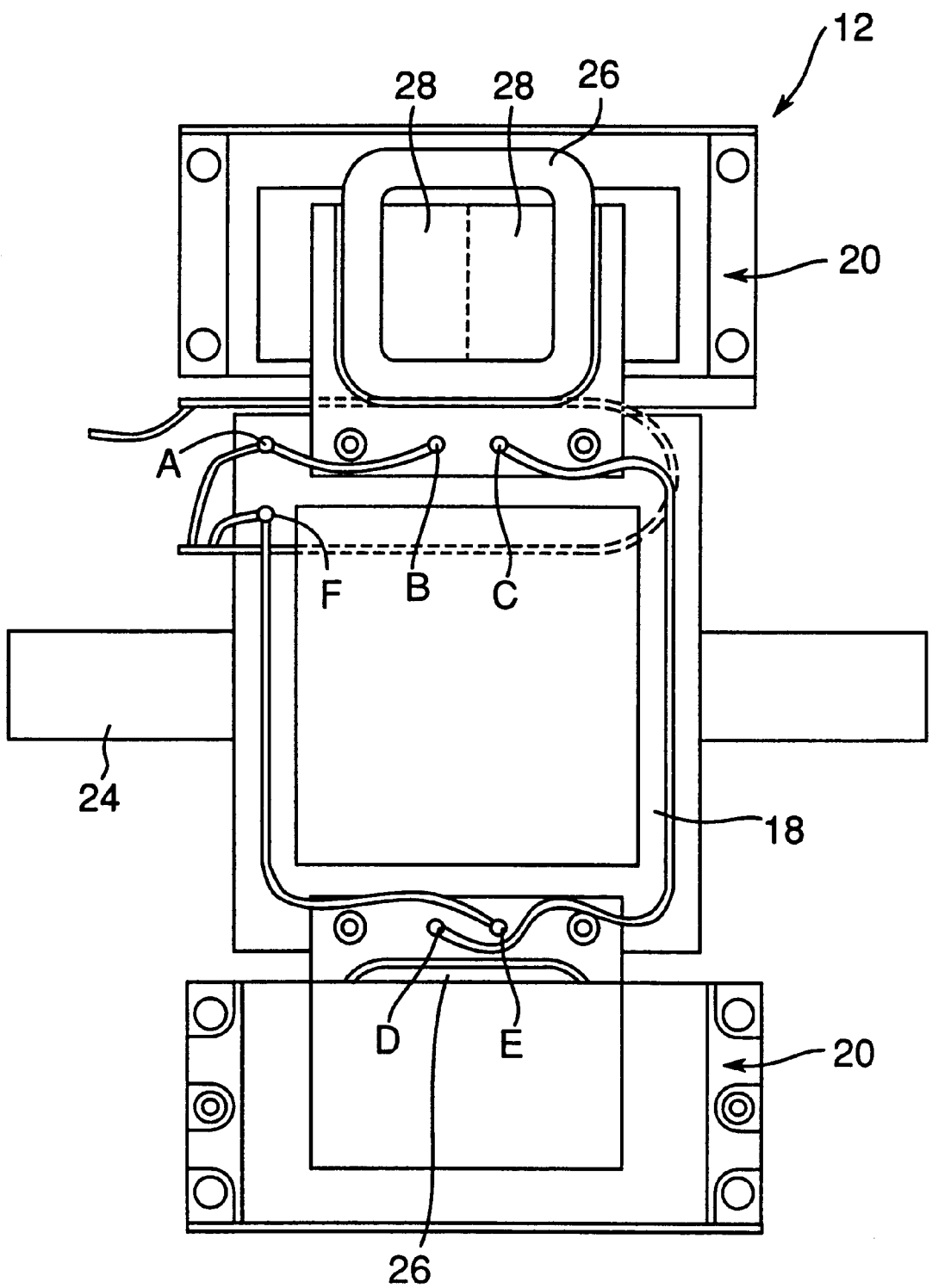
FIG. 14 is a partially cutaway top plan view of an electromotive actuator employed as a drive source in the vibration generating mechanism of FIG. 13.
Figure 15:
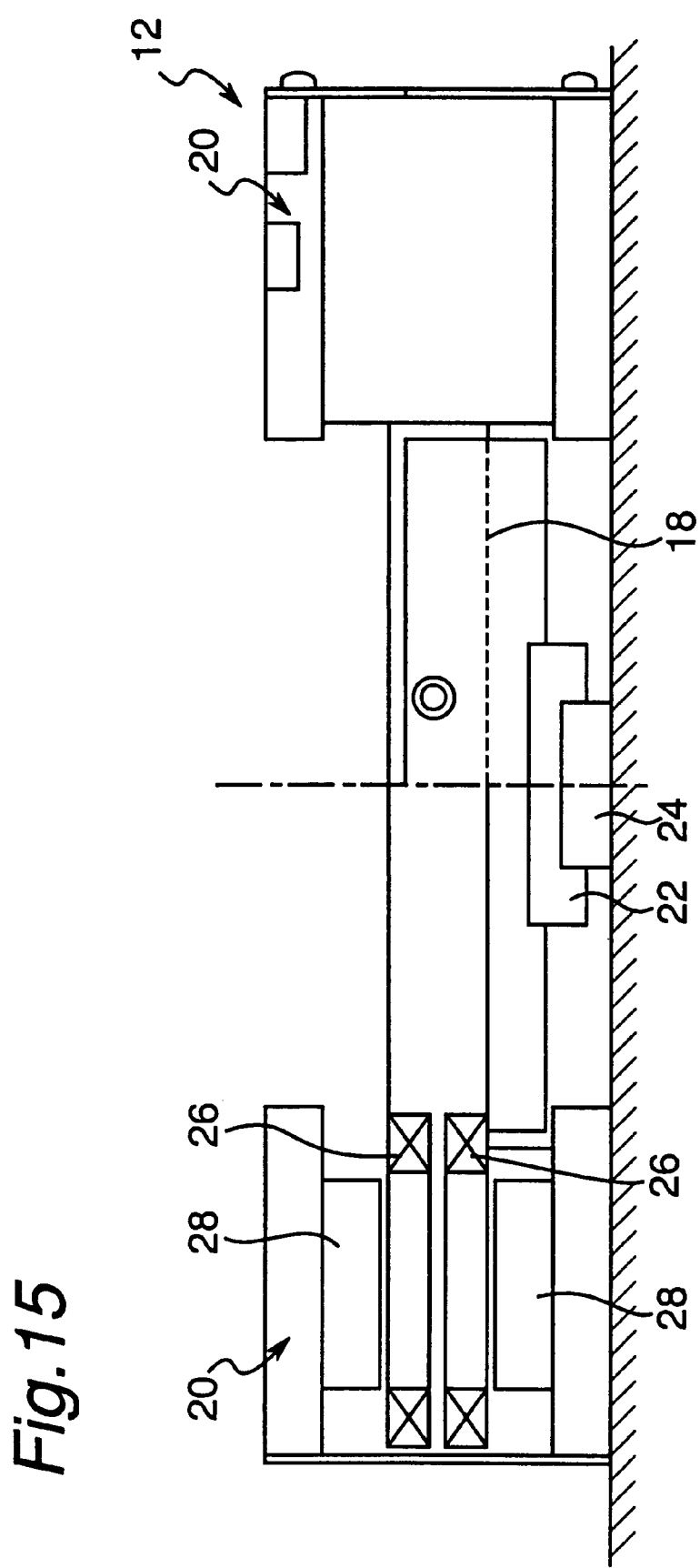
FIG. 15 is a side view, partly in section, of the electromotive actuator of FIG. 14.

As shown in FIGS. 13 to 15, the electromotive-type actuator 12 includes a holder 18, two magnetic circuits 20 disposed on respective sides of the holder 18, a linear bearing 22 secured to the lower surface of the holder 18, and a linear guide 24 secured to a mounting surface. The linear bearing 22 is slidably mounted on the linear guide 24.

Each of the magnetic circuits 20 includes a coil 26 wound around one end of the holder 18 and a plurality of permanent magnets 28 disposed above and below the coil 26 so as to be spaced a predetermined distance therefrom.

Figure 16:
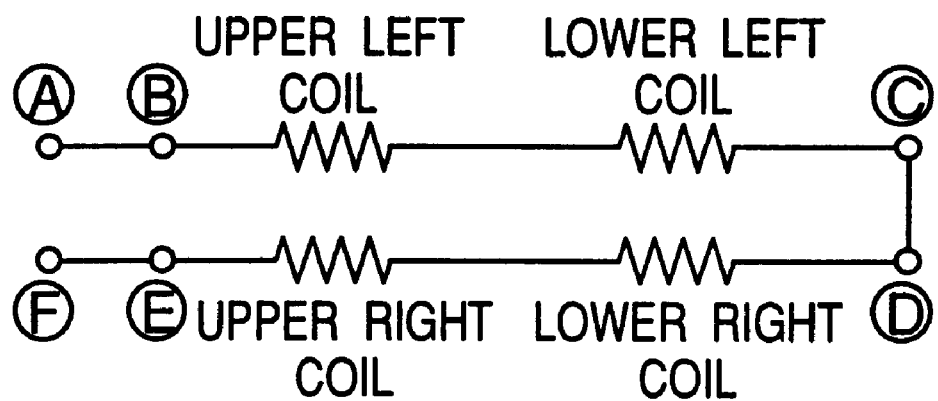
FIG. 16 is a wiring diagram of coils formed in the electromotive actuator of FIG. 14.

Although each of the coils 26 has two layers formed one above the other on one side of the holder 18, the two coils 26 are connected in series, as shown in FIG. 16, as if they are made up of a single copper wire. That is, in FIGS. 13 and 14, a terminal A is connected to a terminal B, and upper left and lower left coils are formed in this order. Then, a terminal C is connected to a terminal D, and lower right and upper right coils are formed in this order. Finally, a terminal E is connected to a terminal F.

Figure 17:
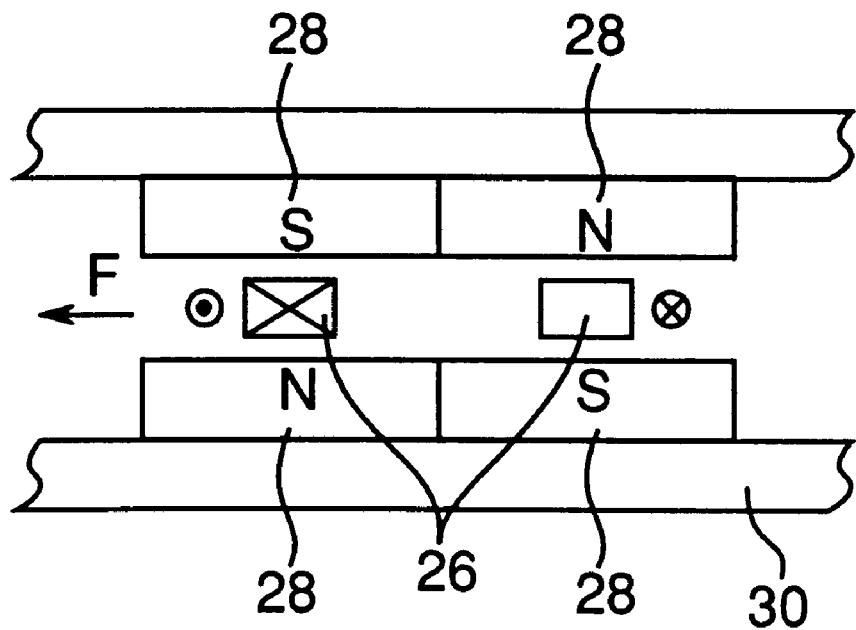
FIG. 17 is a schematic side view of a magnetic circuit mounted in the electromotive actuator of FIG. 14.
Figure 18:
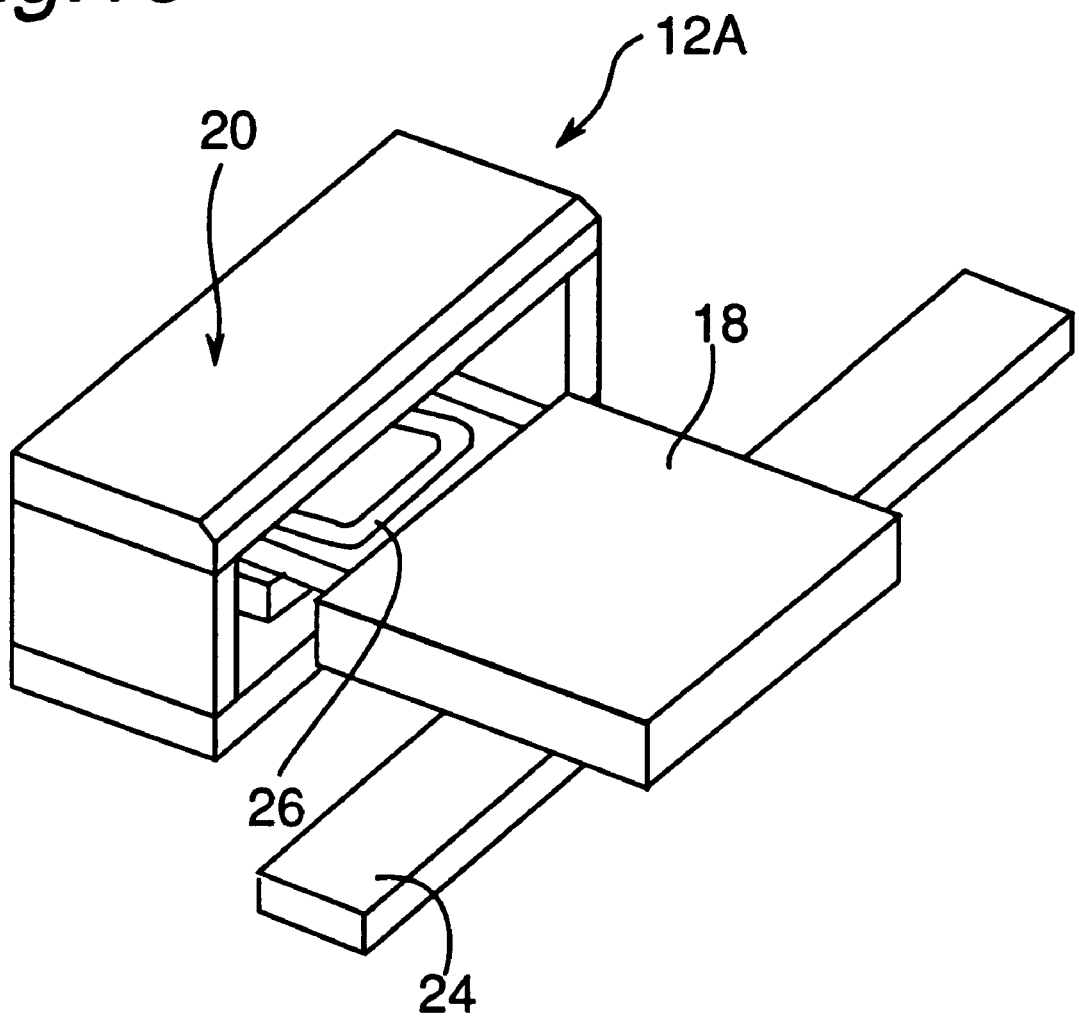
FIG. 18 is a perspective view of a modification of the electromotive actuator.

As shown in FIG. 17, the plurality of permanent magnets 28 confront the coils 26 on respective sides of the holder 18

(the upper left and lower left coils on one side and the upper right and lower right coils on the other side). The permanent magnets 28 disposed on each side of the holder 18 include two upper permanent magnets secured to the lower surface of an upper wall of a casing 30 and having opposite magnetic poles directed downwards, and two lower permanent magnets secured to the upper surface of a bottom wall of the casing 30 and having opposite magnetic poles directed upwards so that opposite magnetic poles may be opposed to each other between the associated upper and lower permanent magnets.

When exciting current is caused to flow in the magnetic circuits 20 of the above-described construction, a force F is applied to the coils 26 based on the Fleming's rule, thereby moving the holder 18 along the linear guide 24 in the direction of the force F. Accordingly, when exciting pulse current is caused to flow in the coils 26, the coils 26 together with the holder 18 move back and forth. That is, the electromotive-type actuator 12 employed in this embodiment converts electric energy into mechanical energy.

It is to be noted here that although in the above-described embodiment the holder 18 has been described as having two coils 26 wound around respective ends thereof, it may have only one coil made up of a single copper wire wound around one end thereof.

It is also to be noted that although in the above-described embodiment two permanent magnets 28 are secured to each of the upper and bottom walls of the casing 30, only one permanent magnet may be secured to each of the upper and bottom walls, with opposite magnetic poles opposed to each other.

Figure 19:
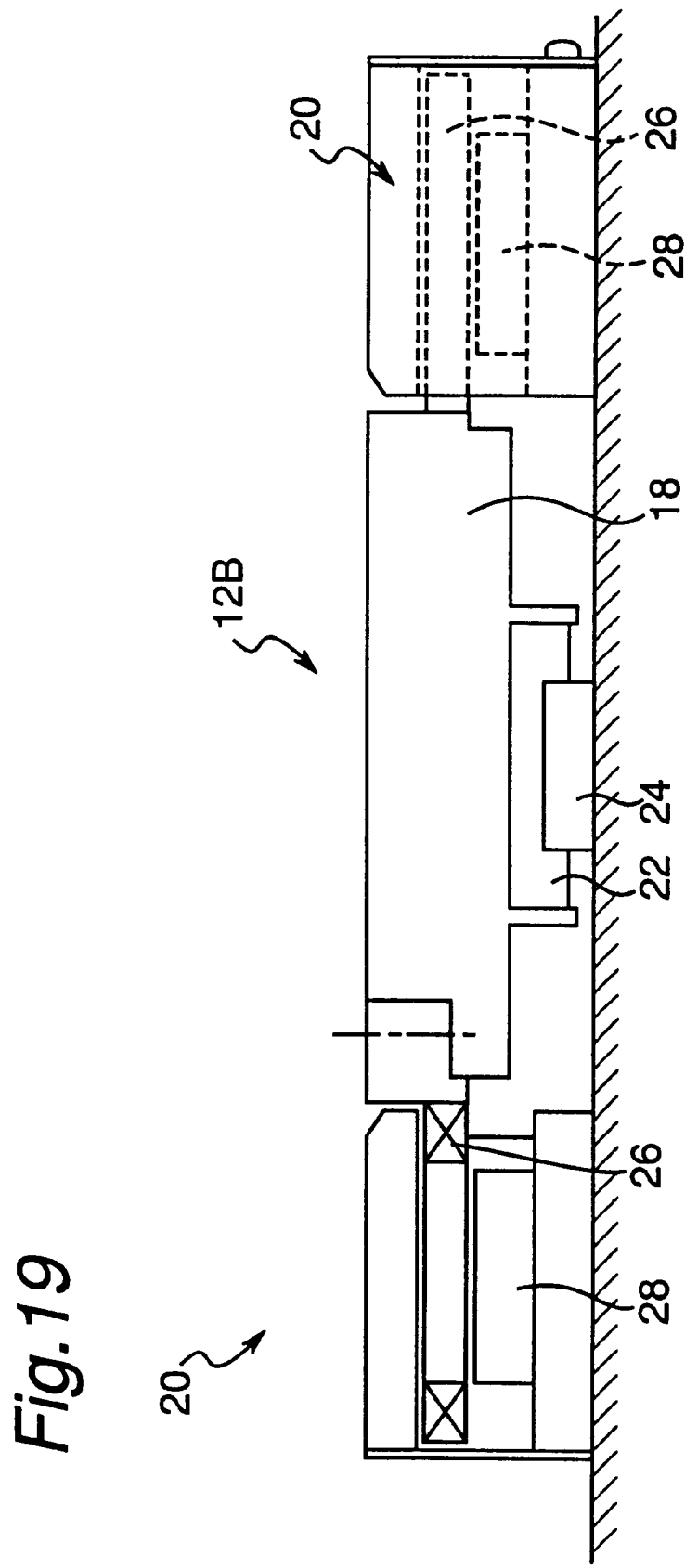
FIG. 19 is a side view, partly in section, of another modification of the electromotive actuator.

It is further to be noted that the actuator may be an electromotive-type actuator 12B shown in FIG. 19 that includes only one permanent magnet 28 secured to the upper surface of the bottom wall of each of the two casings 30 disposed on respective sides of the holder 18.

In the embodiment shown in FIGS. 13 to 15, four neodymium-based magnets (Trade name: NEOMAX-42)(11 mmH×35 mmW×42 mmL) were used for the permanent magnets 28 on each side of the holder 18, while two generally flat air-core coils each having 160 turns and made up of a φ0.72-EIW copper wire were bonded to a resinous bobbin on each side of the holder 18. All such coils (four coils) connected in series had a resistance of 4.51Ω. The magnetic circuits weighed 1850 g×2=3700 g and all the coils weighed 890 g.

Figure 20:
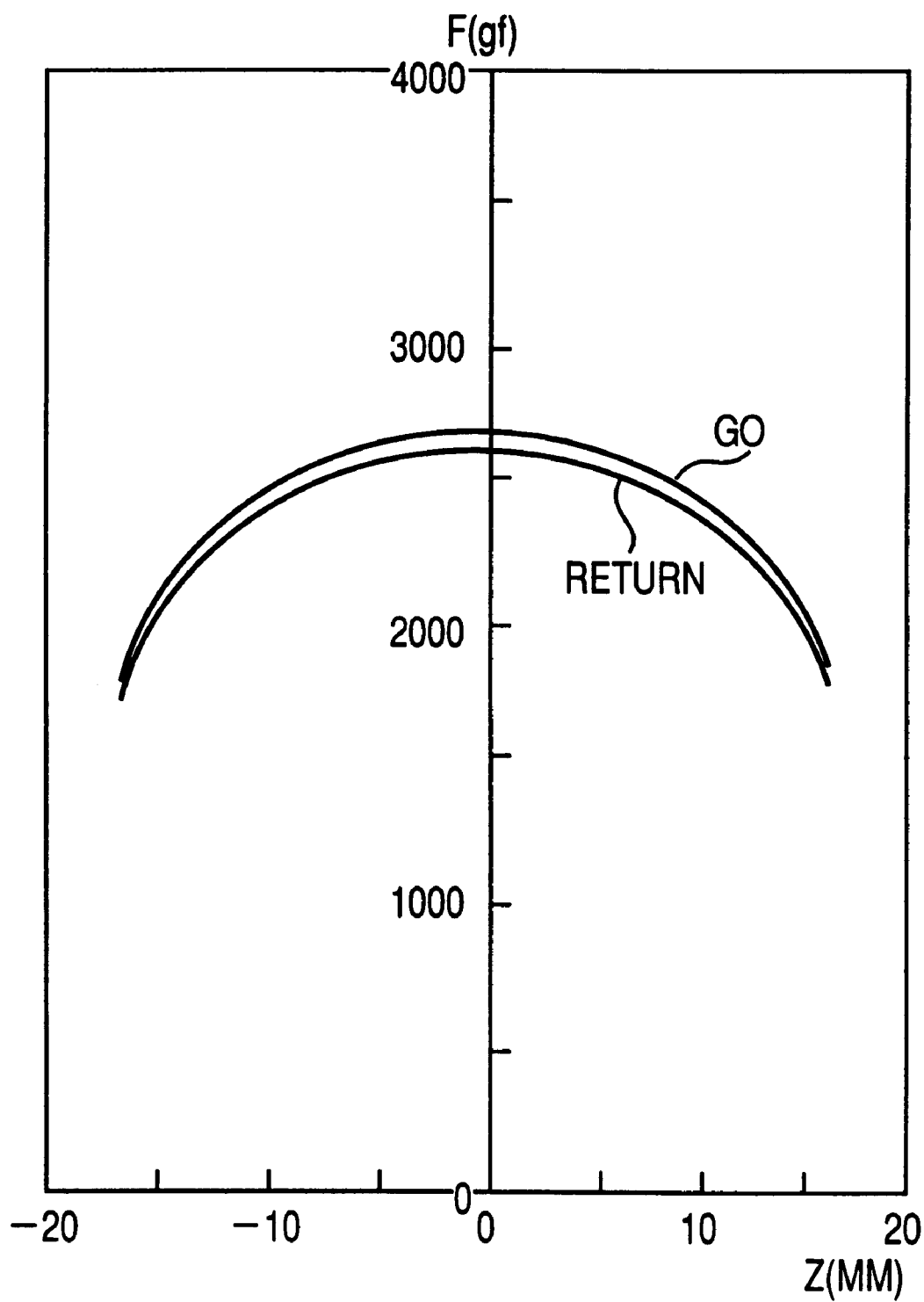
FIG. 20 is a graph showing a thrust distribution when electric current of 1 A is caused to flow in the electromotive actuator of FIG. 14.

Upon measurement of a thrust distribution per 1 A of the electromotive-type actuator 12 of the above specification, a result as shown in FIG. 20 was obtained. It can be seen from the result of FIG. 20 that a thrust of 2.64 kgf/A (26 N/A) was obtained at the center of a 30 mm stroke.

In the above-described construction, when the first permanent magnet 14 is reciprocated along the linear guide 24 by the electromotive-type actuator 12 as a drive source with a load W applied to the second permanent magnet 16, the second permanent magnet 16 that confronts the first permanent magnet 14 with the same magnetic poles opposed to each other moves vertically. That is, the vibration generating mechanism of FIGS. 13 to 15 creates excitation by periodically changing the opposing area of the two permanent magnets 14 and 16, thus generating periodic vibration in the vertical direction.

It is, however, to be noted that depending on the magnitude of the load W applied to the second permanent magnet 16, two force imparting members 32, 34 such as permanent magnets and two force imparting members 36, 38 such as permanent magnets may be disposed on respective sides of the first and second permanent magnets 14 and 16 with the same magnetic poles opposed to each other, as shown in FIG. 13. In this construction, when the electromotive-type actuator 12 and the permanent magnets disposed on respective sides thereof are secured to, for example, a base plate 40, while the second permanent magnet 16 and the permanent magnets disposed on respective sides thereof are secured to, for example, a top plate 42, and when the top plate 42 is vertically movably mounted on the base plate 40 via a plurality of vertical shafts or the like, it makes possible to periodically vibrate the load W.

More specifically, the stationary members 32, 34, 36, and 38 in the form of magnets, act to support the load W, while a sliding movement of the exciting magnet (the first permanent magnet 14) causes the vertical vibration. At this moment, the balanced point of the second permanent magnet 16 relative to the first permanent magnet 14 and the amplitude of the second permanent magnet 16 are provisionally determined depending on the volume of the first and second permanent magnets 14 and 16. The amount of stroke of the exciting magnet 14 is set depending on a load-deflection curve, the amplitude, and the loaded mass. The center of stroke of the exciting magnet 14 is a reference position to determine a neutral position of the electromotive-type actuator 12 employed as a drive source.

The top dead point and the bottom dead point of the second permanent magnet 16 are determined depending on the amount of stroke of the exciting magnet 14 in the horizontal direction, while vertical and horizontal loads at each of the top and bottom dead points are determined depending on the amount of lapping of the exciting magnet 14 relative to the second permanent magnet 16 and the amount of gap therebetween.

It is to be noted here that although in the above-described construction the load W applied to the second permanent magnet 16 is supported by the two pairs of force imparting members 32, 34, 36, and 38 in the form of permanent magnets disposed on respective sides of the electromotive-type actuator 12, plurality of, for example two, elastic members such as coil springs the members 32, 34, 36 and 38 may be in the form of a so that the load W applied to the second permanent magnet 16 can be supported by making use of a restoring force of the elastic members.

The vibration generating mechanism of the above-described construction is controlled as follows.

Figure 21:
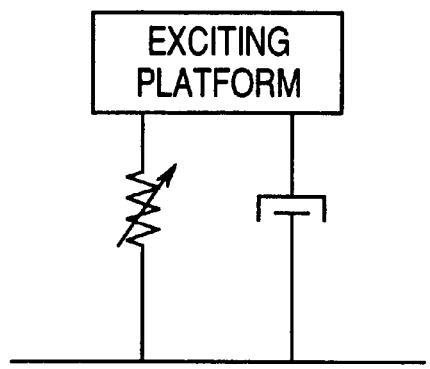
FIG. 21 is a schematic view of a mechanical model of the vibration generating mechanism according to the present invention.

Sine waves, random waves or the like are generally used for drive waves of the actuator 12. As shown in a mechanical model of FIG. 21, a sensor such as, for example, a potentiometer for sensing the motion of the actuator 12 is required to feed-back control the position or acceleration of the actuator 12 to be a target one.

When the sine waves are used for the drive waves, a position sensor such as a rotary encoder or a potentiometer is required to sense the motion of the exciting platform (the top plate 42 in FIG. 13) for subsequent control of the amplitude thereof, while an acceleration sensor is required to sense the acceleration of the exciting platform for subsequent control of the acceleration thereof. On the other hand, when the random waves are used for the drive waves, a position sensor such as a rotary encoder or the like is required to sense the motion of the exciting platform.

Figure 22:
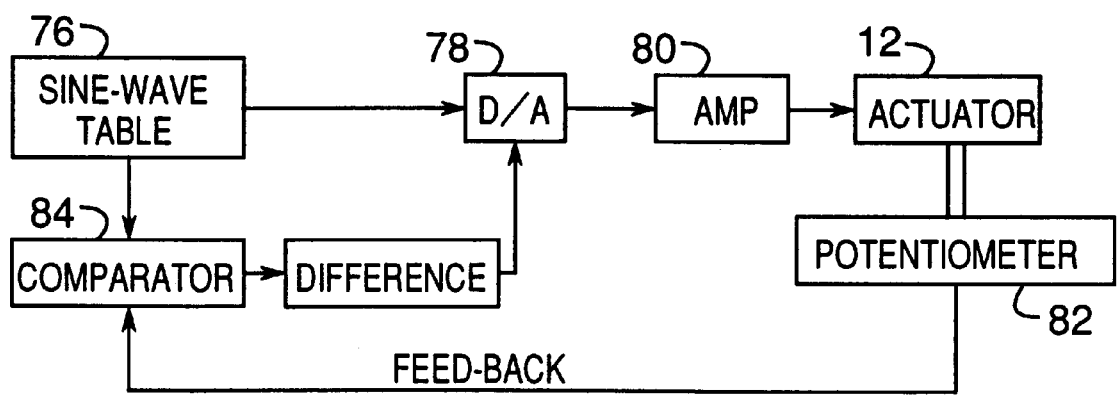
FIG. 22 is a block diagram showing a closed-loop control when the electromotive actuator is driven with sine waves.
Figure 23:
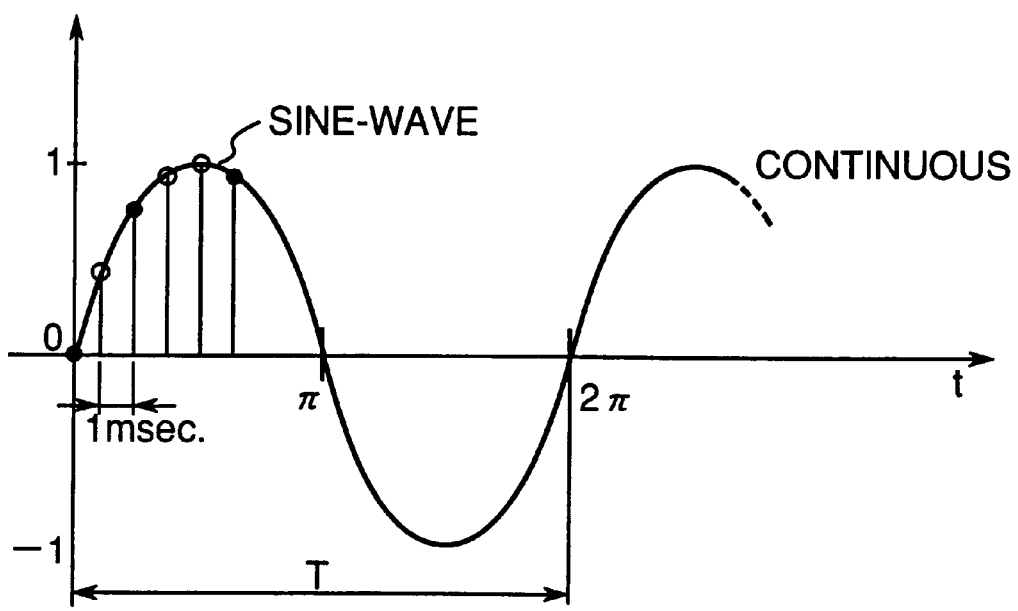
FIG. 23 is a graph of the sine waves employed as drive waves.

FIG. 22 is a block diagram depicting a closed-loop control when the actuator 12 is controlled with sine waves shown in FIG. 23.

In FIG. 22, data is first outputted from a sine-wave table 76 to a digital-analogue converter (D/A) 78 at a predetermined timing (for example, every 1 msec), and a voltage value of the D/A 78 is inputted to an amplifier 80 such as, for example, a pulse-width modulation (PWM) control amplifier, thereby driving the actuator 12. A comparator 84 compares the output from the sine-wave table 76 with a value indicated by a potentiometer 82 that is connected to the actuator 12, and a difference therebetween is outputted to the D/A 78 so that the actuator 12 may be driven to a target position.

The sine-wave table 76 may be electrically connected to, for example, a personal computer. In that case, a START command from the personal computer causes the sine-wave table 76 to output predetermined sine waves and continue outputting until a STOP or CLEAR command is received.

Figure 24:
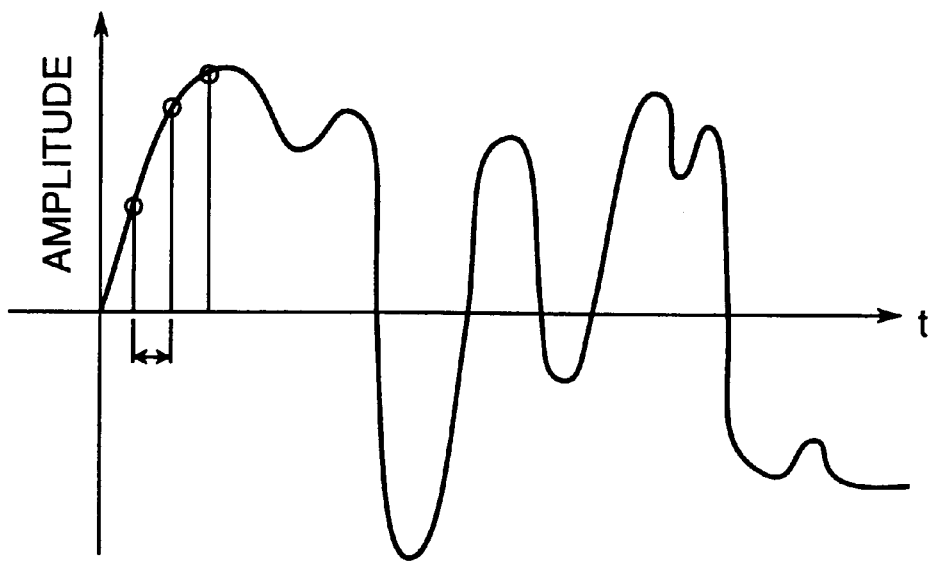
FIG. 24 is a graph similar to FIG. 23, but depicting random waves employed as the drive waves.

Random waves as shown in FIG. 24 can be used for the drive waves. In that case, based on a START command sent from the personal computer, a value of amplitude is outputted from the amplifier 80 to the actuator 12 at a predetermined timing for subsequent closed-loop control in which the actuator 12 is set to the target position. Such output is maintained until next data is sent from the amplifier 80.

As described above, according to the present invention, one of two opposing permanent magnets is reciprocated periodically relative to the other with a drive force of an electromotive actuator to change the opposing area of the two permanent magnets, thereby vibrating the other permanent magnet. Accordingly, a load applied to the other permanent magnet can be vibrated by making use of a repulsive force of the permanent magnets, thus facilitating the manufacture of a relatively compact and inexpensive vibration generating mechanism with low noise emission.

Furthermore, the two permanent magnets are spaced vertically, and a vertically applied load is supported by means of repulsive forces of two pairs of permanent magnets or restoring forces of at least two elastic members disposed on respective sides of the two permanent magnets. This construction can cope with a relatively large load, making it possible to generate desired vibration.

Because the electromotive actuator is constituted by a sidably arranged holder to which one of the two permanent magnets is secured, a coil wound around at least one end of the holder, and at least one permanent magnet spaced a predetermined distance from the coil, the holder can slide under a substantially non-contact condition at portions other than a sliding portion thereof. Accordingly, the electromotive actuator generates less noise than conventional actuators and contributes to the manufacture of a compact and inexpensive vibration generating mechanism.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A vibration generating mechanism comprising:

first and second permanent magnets spaced from each other over an opposing area therebetween with like magnetic poles opposed to each other; and an electromotive actuator for moving said first permanent magnet periodically and reciprocally relative to said second permanent magnet to change said opposing area, thereby causing said second permanent magnet to vibrate relative to said first permanent magnet;

wherein said first and second permanent magnets are spaced vertically, and further comprising force imparting members disposed on respective sides of said first and second members for supporting a load applied vertically to said second permanent magnet;

wherein said force imparting members comprise a first pair of permanent magnets and a second pair of permanent magnets disposed on said respective sides of said first and second permanent magnets, each of said first and second pairs of permanent magnets being spaced vertically with like magnetic poles opposed to each other, whereby said load applied vertically to said second permanent magnet is supported by repulsive forces of said first and second pairs of permanent magnets.

2. A vibration generating mechanism comprising:

first and second permanent magnets spaced from each other over an opposing area therebetween with like magnetic poles opposed to each other; and an electromotive actuator for moving said first permanent magnet periodically and reciprocally relative to said second permanent magnet to change said opposing area, thereby causing said second permanent magnet to vibrate relative to said first permanent magnet;

wherein said first and second permanent magnets are spaced vertically, and further comprising force imparting members disposed on respective sides of said first and second members for supporting a load applied vertically to said second permanent magnet;

wherein said force imparting members comprise at least two elastic members disposed on said respective sides of said first and second permanent magnets, whereby said load applied vertically to said second permanent magnet is supported by restoring forces of said at least two elastic members.

3. A vibration generating mechanism comprising:

first and second permanent magnets spaced from each other over an opposing area therebetween with like magnetic poles opposed to each other; and an electromotive actuator for moving said first permanent magnet periodically and reciprocally relative to said second permanent magnet to change said opposing area, thereby causing said second permanent magnet to vibrate relative to said first permanent magnet;

wherein said electromotive actuator comprises a holder, a coil wound around at least one end of said holder, and at least one permanent magnet spaced a predetermined distance from said coil, said first permanent magnet being secured to said holder, and whereby said holder is reciprocated by causing pulse current to flow through said coil.

4. A vibration generating mechanism comprising:

first and second permanent magnets spaced from each other over an opposing area therebetween with like magnetic poles opposed to each other; and an electromotive actuator for moving said first permanent magnet periodically and reciprocally relative to said second permanent magnet to change said opposing area, thereby causing said second permanent magnet to vibrate relative to said first permanent magnet;

wherein said electromotive actuator moving said first permanent magnet relative to said second permanent magnet changes a size of said opposing area.

5. A vibration generating mechanism comprising:

first and second permanent magnets spaced from each other over an opposing area therebetween with like magnetic poles opposed to each other; and an electromotive actuator for moving said first permanent magnet periodically and reciprocally relative to said second permanent magnet to change said opposing area, thereby causing said second permanent magnet to vibrate relative to said first permanent magnet;

wherein said first and second permanent magnets have respective surfaces that confront each other to define said opposing area.

6. A mechanism as claimed in claim 5, wherein said surfaces are planar.

7. A mechanism as claimed in claim 5, wherein said surfaces are parallel to each other.

* * * * *